United States Patent
Fornell et al.

(10) Patent No.: US 11,795,096 B2
(45) Date of Patent: Oct. 24, 2023

(54) APPARATUS AND METHOD FOR PROCESSING A GLASS SHEET

(71) Applicant: CORNING INCORPORATED, Corning, NY (US)

(72) Inventors: Nils Paul Fornell, Harrodsburg, KY (US); James Tollef Gramstad, Danville, KY (US); Pao-Ting Liang, Taichung (TW); Kuo-Cheng Wu, Tainan (TW)

(73) Assignee: CORNING INCORPORATED, Corning, NY (US)

( * ) Notice: Subject to any disclaimer, the term of this patent is extended or adjusted under 35 U.S.C. 154(b) by 467 days.

(21) Appl. No.: 17/054,832

(22) PCT Filed: May 13, 2019

(86) PCT No.: PCT/US2019/032023
§ 371 (c)(1),
(2) Date: Nov. 12, 2020

(87) PCT Pub. No.: WO2019/222102
PCT Pub. Date: Nov. 21, 2019

(65) Prior Publication Data
US 2021/0238078 A1   Aug. 5, 2021

Related U.S. Application Data

(60) Provisional application No. 62/671,014, filed on May 14, 2018.

(51) Int. Cl.
*C03B 33/033* (2006.01)
*C03B 33/02* (2006.01)
*C03B 33/027* (2006.01)

(52) U.S. Cl.
CPC .......... *C03B 33/033* (2013.01); *C03B 33/027* (2013.01); *C03B 33/0207* (2013.01)

(58) Field of Classification Search
CPC ............ C03B 33/0207; C03B 33/0215; C03B 33/033; Y10T 225/325; Y10T 225/12; Y10T 225/307; Y10T 225/314
(Continued)

(56) References Cited

U.S. PATENT DOCUMENTS

| 3,286,893 A | 11/1966 | Zellers, Jr. |
| 3,303,980 A | 2/1967 | Offenbacher |

(Continued)

FOREIGN PATENT DOCUMENTS

| CN | 101910075 A | 12/2010 |
| CN | 103347828 A | 10/2013 |

(Continued)

OTHER PUBLICATIONS

Taiwanese Patent Application No. 108116350, Office Action, dated Dec. 22, 2022, 1 page; Taiwanese Patent Office.
(Continued)

*Primary Examiner* — Evan H MacFarlane
(74) *Attorney, Agent, or Firm* — Yunling Shang

(57) ABSTRACT

Method and apparatus for removing a peripheral portion of a glass sheet. The glass sheet is placed in a predetermined position. A score line is formed on a major surface of the glass sheet. The score line demarcates a central region and a peripheral portion. A push bar is moved in a direction of a back-up bar assembly such to contact the major surface along the peripheral portion. The push bar is further moved in the direction to cause the peripheral portion to separate from the central region, and then become captured between the push bar and the back-up bar assembly. With some embodiments, the glass sheet is vertically oriented and the
(Continued)

peripheral portion is not constrained during formation of the score line.

19 Claims, 12 Drawing Sheets

(58) Field of Classification Search
USPC .................................. 225/96.5, 2, 94, 95
See application file for complete search history.

(56) References Cited

U.S. PATENT DOCUMENTS

| | | | |
|---|---|---|---|
| 3,779,437 | A | 12/1973 | Yamamoto et al. |
| 3,921,873 | A | 11/1975 | Dahlberg et al. |
| 4,033,490 | A * | 7/1977 | Ulivi ................... C03B 33/033 225/2 |
| 4,285,451 | A | 8/1981 | Ferraino |
| 4,489,870 | A | 12/1984 | Prange et al. |
| 5,535,933 | A | 7/1996 | Dickerson |
| 7,128,250 | B2 | 10/2006 | Luiz |
| 8,047,085 | B2 | 11/2011 | Cady et al. |
| 8,292,141 | B2 | 10/2012 | Cox et al. |
| 8,820,599 | B2 | 9/2014 | Cavallaro et al. |
| 8,887,530 | B2 | 11/2014 | Markham et al. |
| 9,463,993 | B2 | 10/2016 | Brown et al. |
| 9,862,634 | B2 | 1/2018 | Cavallaro et al. |
| 2010/0107848 | A1 | 5/2010 | Joseph, II et al. |
| 2010/0162758 | A1 | 7/2010 | Lang |
| 2012/0047952 | A1* | 3/2012 | Addiego ............... C03B 17/064 65/195 |
| 2012/0199625 | A1 | 8/2012 | Qi et al. |
| 2013/0014200 | A1 | 1/2013 | Niamut et al. |
| 2013/0037592 | A1* | 2/2013 | Cavallaro, III ..... C03B 33/0207 225/2 |
| 2013/0134200 | A1 | 5/2013 | Cavallaro et al. |
| 2014/0103088 | A1 | 4/2014 | Pan |
| 2014/0144965 | A1 | 5/2014 | Brown et al. |
| 2017/0073266 | A1 | 3/2017 | Amosov et al. |
| 2017/0142823 | A1 | 5/2017 | Shim |
| 2018/0099892 | A1 | 4/2018 | Cavallaro et al. |

FOREIGN PATENT DOCUMENTS

| | | | | |
|---|---|---|---|---|
| CN | 105307991 | A | 2/2016 | |
| CN | 106458700 | A | 2/2017 | |
| DE | 1224004 | * | 9/1966 | ........... C03B 33/033 |
| FR | 1466530 | * | 1/1967 | ........... C03B 33/033 |
| JP | 08-253336 | A | 10/1996 | |
| JP | 2009-227550 | A | 10/2009 | |
| JP | 5376282 | B2 | 12/2013 | |
| JP | 2014-528892 | A | 10/2014 | |
| JP | 2016-500049 | A | 1/2016 | |
| KR | 10-2014-0043324 | A | 4/2014 | |
| TW | 201700416 | A | 1/2017 | |
| WO | 2012/108391 | A1 | 8/2012 | |
| WO | 2016/158974 | A1 | 10/2016 | |

OTHER PUBLICATIONS

International Search Report and Written Opinion of the International Searching Authority; PCT/US2019/032023; dated Aug. 29, 2019; 12 Pages; Korean Intellectual Property Office.

Chinese Patent Application No. 201980032484.9, Office Action, dated May 27, 2022, 21 pages (11 pages of English Translation and 10 pages of Original Document), Chinese Patent Office.

Japanese Patent Application No. 2020-563790, office action, dated Mar. 29, 2023, 4 pages (2 pages of English Translation and 2 pages of Original Document), Japanese Patent Office.

* cited by examiner

APPARATUS AND METHOD FOR PROCESSING A GLASS SHEET

CROSS-REFERENCE TO RELATED APPLICATIONS

This application is a national stage entry of International Patent Application Serial No. PCT/US2019/032023, filed on May 13, 2019, which in turn, claims the benefit of priority under 35 U.S.C. § 119 of U.S. Provisional Application Ser. No. 62/671,014 filed on May 14, 2018, the contents of each of which are relied upon and incorporated herein by reference in their entireties.

BACKGROUND

Field

The present disclosure generally relates to apparatuses and methods for processing a glass sheet. More particularly, it relates to apparatuses and methods for removing a peripheral portion from a central portion of a glass sheet, such as removing the bead region(s) from a vertically oriented glass sheet.

Technical Background

In a typical glass manufacturing system, various raw constituents or batch materials are introduced or "charged" into a melting furnace. The batch materials are melted to form a viscous molten material that can be flowed to a fabrication portion of the system. The viscous molten material, when cooled, forms a glass.

The manufacture of glass sheets or other glass articles by melting raw materials is known. In one such process, known as a fusion process, molten glass overflows the sides of a trough in a forming body. The separate flows then re-unite, or fuse, at the bottom of the forming body to form a continuous ribbon of glass. Separate sheets of glass are then separated (e.g., cut) from the glass ribbon. Typically, direct contact with a center region of major surfaces of the as-formed glass sheet is avoided. Instead, only peripheral portions of the glass sheet are subjected to direct contact with solid surfaces such as edge rolls, pulling rolls, edge guiding rolls, and the like. Thus, the peripheral portion at both sides of the glass sheet obtained directly from the forming device, such as in a bottom-of-draw area of a fusion down-draw or slot down-draw process, sometimes called "beads" or "knurls," tends to have lower surface quality than the center region. In addition, depending upon the specific forming device used, the peripheral portions tend to have different thickness and higher thickness variation than the center region.

In many instances, the peripheral portions are separated from the center region of the glass sheet. This can be done to remove the beads, form the center region to a desired size or shape, etc. Conventionally, a score or vent or scribe line is imparted (e.g., mechanical cutting, laser, etc.) into the glass sheet near the peripheral portion. Following scoring, the peripheral portion is separated from the center region by, for example, engaging the peripheral portion and bending it about a nosing strip that is on the opposite major face of the glass sheet as the score line, such that separation between the peripheral portion and the center region occurs along the score line.

During the glass sheet during the peripheral portion separation and removal operations, the glass sheet will be arranged at a particular orientation (e.g., vertical, horizontal, etc.) depending upon the particular glass sheet manufacturing system employed. When processing a vertically oriented glass sheet on a mass production basis, the separation and removal equipment typically includes a vacuum cup assembly or a clamping bar assembly, along with a scoring device. The vacuum cup or clamping bar assembly is first attached to the peripheral portion to be removed, followed by operation of the scoring device to form the score line. Then, the vacuum cup or clamping bar assembly is actuated to effectuate bending of the attached peripheral portion, followed by breaking or separation of the peripheral portion from the center region along the score line. This approach controls the peripheral portion throughout the separation process, beneficially preventing the separated peripheral portion from contacting the center region (e.g., were the separated peripheral portion permitted to freely fall under the force of gravity immediately after separation, the separated peripheral portion might contact and damage the center region). While widely accepted, certain concerns arise. For example, the vacuum cup or clamping bar assembly can induce a deformation stress into the glass sheet, possibly causing inconsistent scoring and/or separation. Where vacuum cups are employed, additional cycle time is required to generate a necessary vacuum pressure at the glass sheet surface. Further, the vacuum cups have to be replaced frequently (e.g., due to exposure to hot glass, high frequency of use, cuts from broken glass sheets, etc.), and may require that the peripheral portion have a larger than desired area in order to accommodate a size of the vacuum cups.

Accordingly, alternative apparatuses and methods for processing a glass sheet, for example removing a peripheral portion from a central region of a glass sheet, are disclosed herein.

SUMMARY

Some embodiments of the present disclosure relate to a method of removing a peripheral portion of a glass sheet. As received, the glass sheet comprises a first major surface opposite a second major surface, a first side edge surface opposite a second side edge surface, and a third side edge surface opposite a fourth side edge surface. Each of the side edge surfaces connect the first major surface and the second major surface. The glass sheet is placed in a predetermined position by securing the first and second major faces, such as in a vicinity of the third side edge surface. A score line is formed on the first major surface that extends from a vicinity of the third side edge surface to a vicinity of the fourth side edge surface. The score line demarcates a central region and a peripheral portion of the glass sheet. The peripheral portion is defined between the score line and the first side edge surface. Sequential steps are then performed. First, a push bar is moved in a direction of a back-up bar assembly such that the push bar contacts the first major surface along the peripheral portion. In this regard, prior to moving the push bar, the push bar is spaced from the first major surface, and the back-up bar assembly is located opposite the push bar relative to the glass sheet and is spaced from the second major surface. Then, the push bar is further moved in the direction to cause the peripheral portion to separate from the central region. Then, the push bar is further moved in the direction to capture the separated peripheral portion between the push bar and the back-up bar assembly. With the methods of the present disclosure, the peripheral portion is optionally not constrained during formation of the score line. In some embodiments, the predetermined position includes the glass sheet in a substantially vertical orientation. In some embodiments, the back-up bar assembly includes an engagement face, and the method includes advancement of the push bar causing the separated peripheral portion to pivot about the engagement face.

Yet other embodiments of the present disclosure relate to an apparatus for removing a peripheral portion from a central region of a glass sheet. The glass sheet includes a first major surface opposite a second major surface. The removal apparatus includes a support device, a scoring device, a force applicator device, and a back-up bar assembly. The support device is adapted for placing the glass sheet in a predetermined position that includes a primary retention plane. The scoring device is adapted to form a score line on the first major surface that demarcates the peripheral portion from the central regions. The force applicator device includes a push bar. The back-up bar assembly includes a first engagement face. In a cycle start state of the removal apparatus, the push bar and the first engagement face are located at opposite sides of the primary retention plane. The force applicator device is adapted to move the push bar in a direction of the first engagement face to sequentially cause the push bar to apply a pushing force onto the first major surface at the peripheral portion to cause the peripheral portion to separate from the central region at the score line, then to cause the separated peripheral portion to contact the first engagement face, and then to cause the separated peripheral portion to become captured between the push bar and the back-up bar assembly. In some embodiments, the back-up bar assembly further includes a second engagement face spaced from the first engagement face, with a distance between the first engagement face and the primary retention plane in a direction perpendicular to the primary retention plane being less than a distance between the second engagement face and the primary retention plane in a direction perpendicular to the primary retention plane. In some embodiments, the scoring device, force applicator device, and back-up bar assembly are configured and arranged such that relative to the primary retention plane, a back-up position of the first engagement face is between a score position of the scoring device and a push position of the force applicator device.

Yet other embodiments of the present disclosure relate to a method for making a glass sheet article. The method includes forming a glass ribbon and separating a glass sheet from the glass ribbon. The glass sheet is delivered to a removal apparatus. The removal apparatus is operated to place the glass sheet in a predetermined position and form a score line on a first major surface of the glass sheet. The score line demarcates a central region and a peripheral portion of the glass sheet. The peripheral portion is defined between the score line and a side edge surface of the glass sheet. Sequential steps are then performed. First, a push bar is moved in a direction of a back-up bar assembly such that the push bar contacts the first major surface along the peripheral portion. Prior to moving the push bar, the push bar is spaced from the first major surface, and the back-up bar assembly is located opposite the push bar relative to the glass sheet and is spaced from a second major surface of the glass sheet. Then, the push bar is further moved in the direction to cause the peripheral portion to separate from the central region. Then, the push bar is further moved in the direction to capture the separated peripheral portion between the push bar and the back-up bar assembly. Following removal of the peripheral portion, the central region comprises a glass sheet article.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Figure 1A:
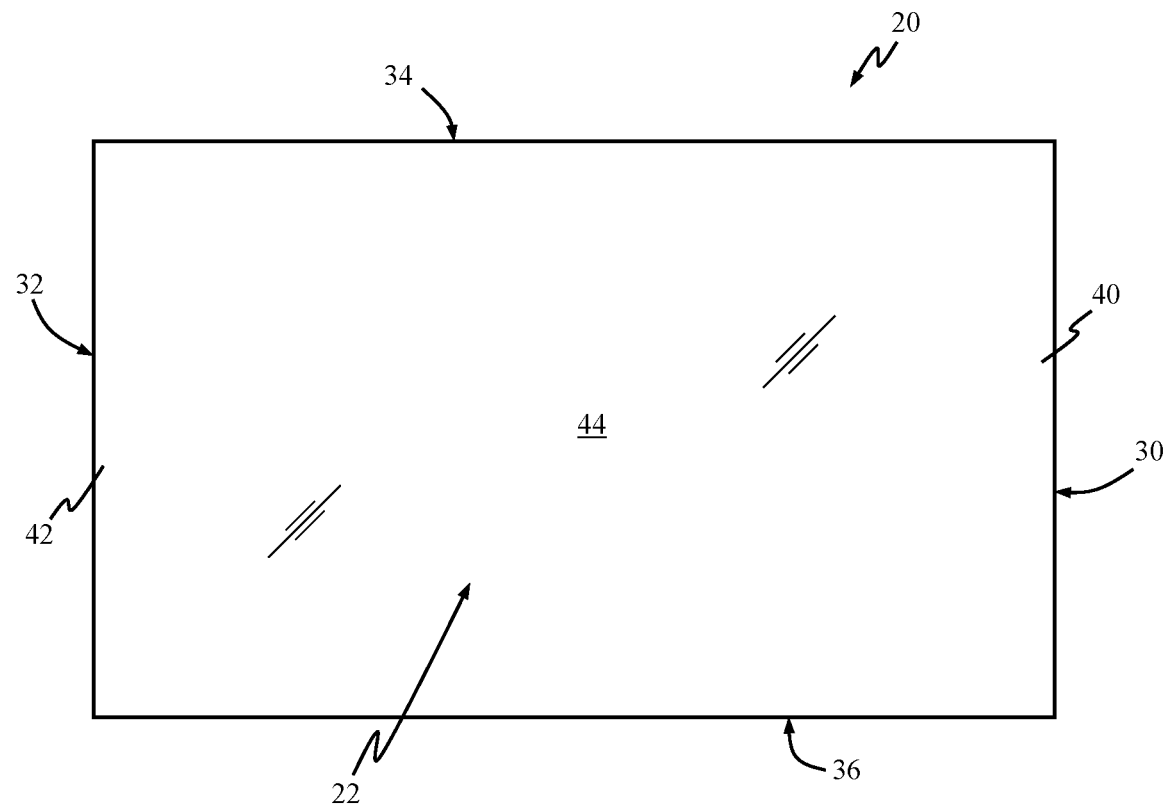
FIG. 1A is a simplified front view of a glass sheet comprising a center region and two bead regions that may be subjected to peripheral portion removal in accordance with principles of the present disclosure.

Reference will now be made in detail to various embodiments of apparatuses and methods for processing a glass sheet, and in particular for removing one or more peripheral portions from a central region of a glass sheet. In some aspects, the apparatuses and methods of the present disclosure are advantageous for removing the bead or knurl regions of a glass sheet. However, one having ordinary skill in the art will appreciate that, upon reading the specification of the present disclosure and with the benefit of the teachings herein, the apparatuses and methods of the present disclosure may be used from removing a peripheral portion of any glass sheet, which may or may not be a portion comprising a bead or knurl. For example, the apparatuses and methods as disclosed herein can be used to resize a glass sheet without a bead or knurl region. Whenever possible, the same reference numerals will be used throughout the drawings to refer to the same or like parts. However, this disclosure may be embodied in many different forms and should not be construed as being limited to the embodiments set forth herein.

Glass sheets are commonly fabricated by forming a glass ribbon with a glass ribbon forming apparatus, separating a glass sheet from the glass ribbon by a separating apparatus, and removing one or more peripheral portions of the glass sheet by a removal apparatus. Glass ribbons are commonly fabricated by flowing molten glass to a forming body whereby a glass ribbon may be formed by a variety of ribbon forming processes including float, slot draw, down-draw, fusion down-draw, up-draw, or any other forming processes. The glass ribbon from any of these processes may then be subsequently divided to provide one or more glass sheets suitable for further processing into a desired application including, but not limited to, a display application.

Figure 1B:
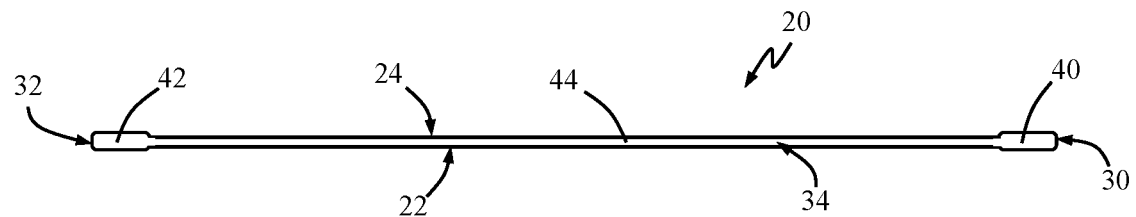
FIG. 1B is a simplified end view of the glass sheet of FIG. 1A.

For convenience of description, a glass sheet is a piece of glass material having two, opposing major surfaces (i.e., a first major surface and a second major surface), with a width, a length and a thickness defined as the distance from the first major surface to the second major surface. By way of further explanation, FIGS. 1A and 1B, schematically illustrates a front view and an end view, respectively, of a glass sheet 20, such as a glass sheet separated from a glass ribbon formed by a fusion down-draw process. The glass sheet 20 has opposing, first and second major surfaces 22, 24. The first and second major surfaces 22, 24 are connected by a first side edge surface 30 opposite a second side edge surface 32, and a third side edge surface 34 opposite a fourth side edge surface 36. Each of the edge surfaces 30, 32, 34, 36 connect the first and second major surfaces 22, 24.

Figure 1C:
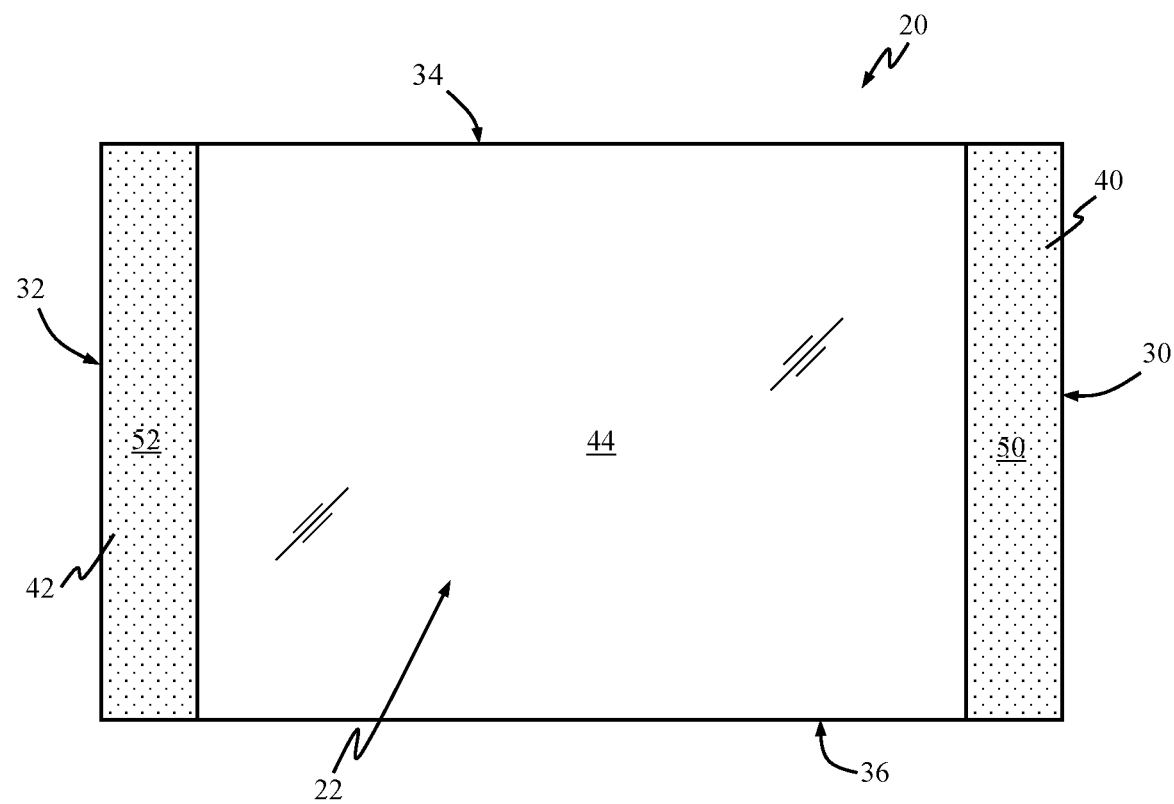
FIG. 1C is the simplified front view of the glass sheet of FIG. 1A and indicating possible peripheral portions to be removed in accordance with principles of the present disclosure.

As used herein, a "peripheral portion" of a glass sheet is in reference to a portion corresponding to and in the vicinity of a designated one of the side edge surfaces 30, 32, 34, 36 intended to be removed from the rest of the glass sheet 20. As described in greater detail below, aspects of the present disclosure relate to removing one or more peripheral portions of the glass sheet 20 from a remainder of the glass sheet 20. For example, in some non-limiting embodiments, the glass sheet 20 may have or form one or more bead or knurl regions, such as a first bead region 40 corresponding and adjacent to the first side edge surface 30, and a second bead region 42 corresponding and adjacent to the second side edge surface 32. As generally reflected by FIG. 1B, the bead regions 40, 42 can have an elevated thickness and/or deviations in thickness as compared to other regions of the glass sheet 20. For example, the glass sheet 20 can comprise a center region 44 having a substantially uniform thickness. The center region 44 is sometimes called the quality region, and is normally the portion of the glass sheet 20 intended to be retained and used for subsequent application. As such, some aspects of the present disclosure relate to separating one or both of the bead regions 40, 42 from the center region 44 by removing a first peripheral portion inclusive of the first bead region 40 and a second peripheral portion inclusive of the second bead region 42. By way of further explanation, FIG. 1C highlights a possible first peripheral portion 50 and a possible second peripheral portion 52 to be removed from the central region 44. The first peripheral portion 50 corresponds to and is in the vicinity of the first side edge surface 30, and includes the first bead region 40. The second peripheral portion 52 corresponds to and is in the vicinity of the second side edge surface 32, and includes the second bead region 42. By removing the first and second peripheral portions 50, 52 from the center region 44, the resultant glass sheet article will consist of the center region 44 and will be free of the bead regions 40, 42. It will be understood that with the glass sheet 20 as initially received (e.g., separated or cut from a continuous glass ribbon) and prior to subsequent processing as described below, the first and second peripheral portions 50, 52 may not be physically apparent in the glass sheet 20 (apart from the physical appearance of the bead regions 40, 42). Rather, an extent or boundary of the peripheral portion 50, 52 is later defined, for example by forming one or more score lines in the glass sheet 20 at a predetermined location along the glass sheet 20 as described below. Thus, the representation of FIG. 1C is provided to convey a better understanding of "peripheral portion" as used throughout the present disclosure.

The apparatuses and methods of the present disclosure are not limited to removing two peripheral portions of the glass sheet 20. In other embodiments, only a single peripheral portion may be removed. Alternatively, three or more peripheral portions of the glass sheet 20 can be removed utilizing the apparatuses and methods of the present disclosure. Moreover, the peripheral portion to be removed need not include or comprise a bead or knurl region. The apparatuses and methods of the present disclosure may be used from removing a peripheral portion of any glass sheet, which may or may not be a portion comprising a bead or knurl. For example, the apparatuses and methods as disclosed herein can be used to resize a glass sheet without a bead or knurl region.

Figure 2:
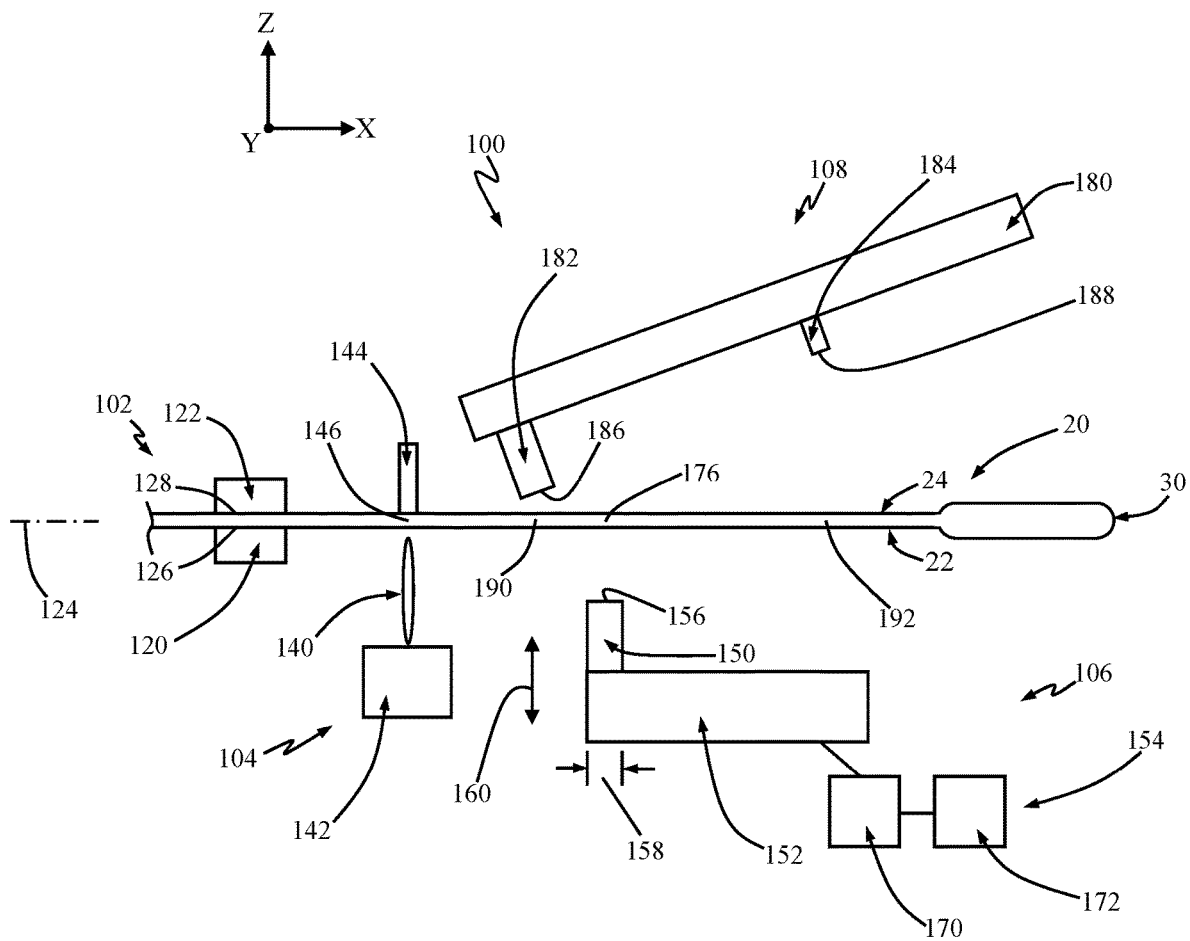
FIG. 2 is a schematic illustration of a side view of a removal apparatus in accordance with principles of the present disclosure and loaded with a glass sheet.
Figure 2:
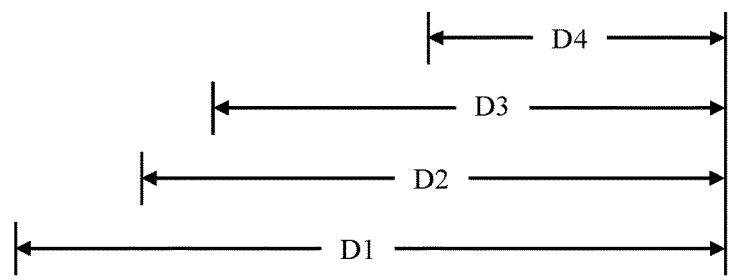

With the above background in mind, portions of a glass sheet peripheral portion removal apparatus 100 in accordance with principles of the present disclosure are shown in simplified form in FIG. 2 for processing a glass sheet, such as the glass sheet 20 described above. As a point of reference, FIG. 2 represents an initial stage of operation (or cycle start) in which the glass sheet 20 has been loaded into the removal apparatus 100. The removal apparatus 100 includes a support device 102, a scoring device 104, a force applicator device 106 and a back-up bar assembly 108. Details on the various components are provided below. In general terms, however, the support device 102 locates and maintains the glass sheet 20 at a predetermined position relative to the scoring device 104, the force applicator device 106 and the back-up bar assembly 108. The scoring device 104 is operable to form a score line or vent or scribe into the glass sheet 20. The force applicator device 106 is operable to apply a pushing force onto a peripheral portion of the glass sheet 20, causing separation of the peripheral portion at the score line. Further, the force applicator device 106 combines with the back-up bar assembly 108 to control the peripheral portion upon separation. As a point of reference, the removal apparatus 100 is depicted in FIG. 2 for processing a section of the glass sheet 20 including and adjacent to the first side edge surface 30. In some optional embodiments, the removal apparatus 100 can be configured to perform a similar peripheral portion removal operation adjacent the second side edge surface 32 (FIG. 1A), such as by including an additional (e.g., identical) scoring device, force applicator device and back-up bar assembly located at an opposite side of the support device 102. Where provided, the removal apparatus 100 can optionally be operated to simultaneously effect removal of a peripheral portion in a vicinity of the first side edge surface 30 and in a vicinity of the second side edge surface 32.

The support device 102 can assume various forms appropriate for interfacing with or engaging the glass sheet 20 in a non-destructive manner to establish a predetermined position of the glass sheet 20 at the removal apparatus 100. A particular format of the support device 102 can be selected to effect a desired orientation of the glass sheet 20 prior to and during the peripheral portion removal operations. For example, in some non-limiting embodiments, the support device 102 can include opposing clamping arms 120, 122 configured and arranged to engage the opposing major surfaces 22, 24, respectively, of the glass sheet 20 in a vicinity of the third side edge surface 34 (FIG. 1A). Other support device constructions are also acceptable. Regardless, the predetermined position established by the support device 102 includes or defines a primary retention plane 124 as identified in FIG. 2. As a point of reference, the opposing major surfaces 22, 24 of the glass sheet 20 are typically substantially co-planar (i.e., within 5 degrees of a truly co-planar relationship), with a major plane of the glass sheet 20 thus being co-planar with the opposing major surfaces 22, 24. When the glass sheet 20 is retained by the support device 102, the major plane of the glass sheet 20 will be oriented in (or co-planar with) the primary retention plane 124 of the support device 102. For example, where the support device 102 includes the clamping arms 120, 122, each of the arms 120, 122 terminates at a clamping face 126, 128, respectively. The clamping faces 126, 128 can be co-planar, such that the primary retention plane 124 is centered between, and is co-planar with, the clamping faces 126, 128. Other support device constructions adapted to establish a primary retention plane for the glass sheet 20 are also acceptable, and may or may not include clamping arms.

Figure 3:
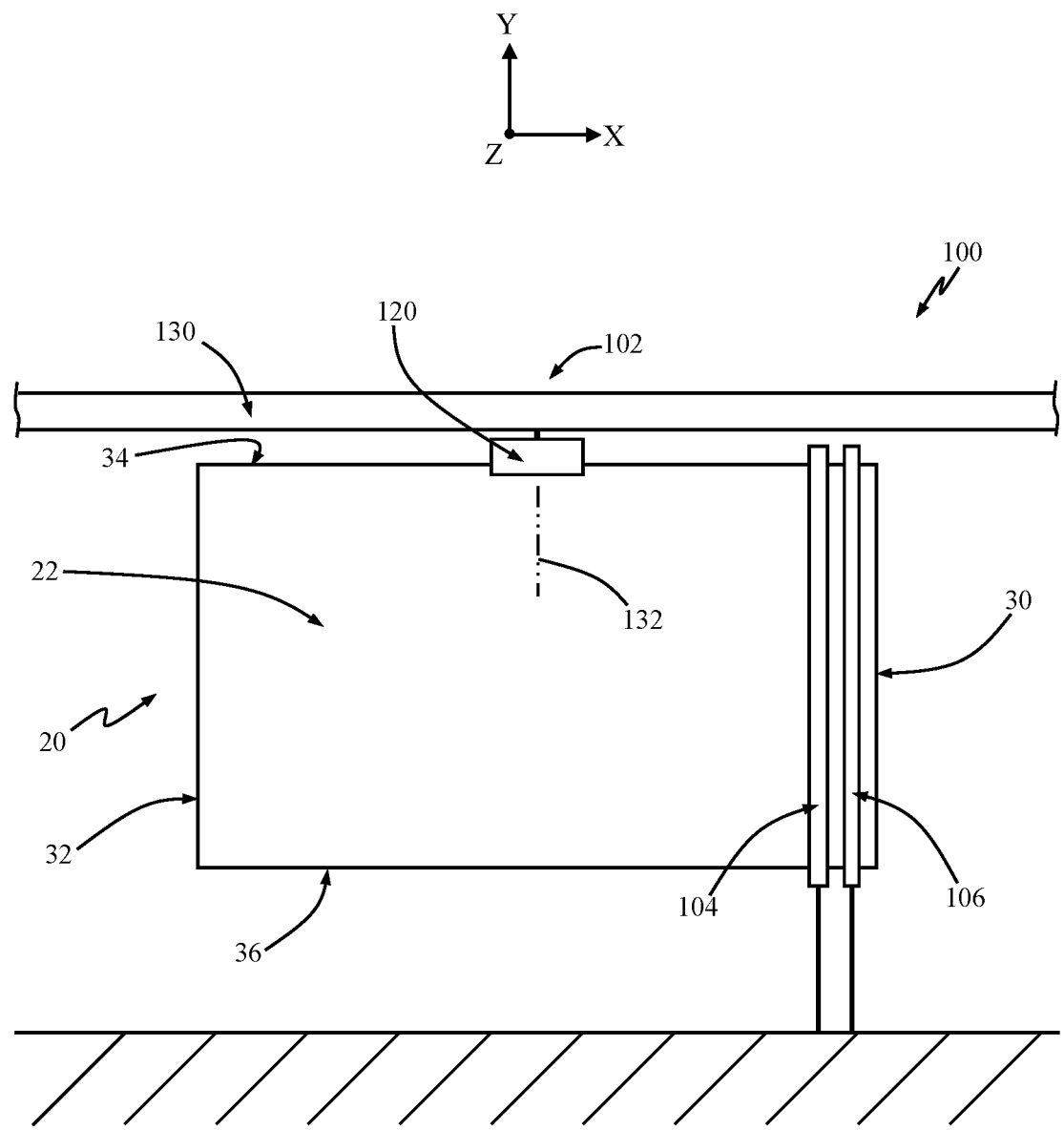
FIG. 3 is a schematic illustration of a front view of a removal apparatus in accordance with principles of the present disclosure and loaded with a glass sheet.

In some embodiments, the apparatuses and methods of the present disclosure are intended to process the glass sheet 20 while the glass sheet 20 is vertically oriented. With these and related embodiments, the support device 102 is configured to establish the primary retention plane 124, and thus the glass sheet 20, in a substantially vertical orientation. An example of this relationship is further reflected in FIG. 3. When vertically oriented, the third side edge surface 34 can be considered an upper side edge surface of the glass sheet 20, and the fourth side edge surface 36 can be considered a bottom side edge surface. With these non-limiting embodiments, the clamping arms 120, 122 can be part of a clamp that is affixed to a suspension system 130, such as a vertical glass sheet suspension conveyor. Normally, the glass sheet 20 is first engaged with the clamping arms 120, 122 outside of the removal apparatus 100, and then moved into the removal apparatus 100 by the conveyor. Regardless, the support device 102 can be configured to retain the glass sheet 20 at a substantially vertical orientation in some non-limiting embodiments (i.e., the first major surface 22 is oriented at an angle of not more than 10 degrees relative to the gravitational acceleration vector). In other embodiments, the apparatuses and methods of the present disclosure are adapted to effect peripheral portion removal operations on a glass sheet that is not vertically oriented. With these and related embodiments, the support device 102 can assume other forms that may or may not include a clamping device affixed to a suspension system. For example, the support device 102 can be formatted to establish the primary retention plane 124 (FIG. 2) in a substantially horizontal orientation, at an angle between substantially vertical and substantially horizontal, etc., with the glass sheet 20 being retained in the so-established orientation. Regardless of an exact format, and as generally reflected by FIG. 2, in some embodiments the support device 102 is configured so as to not engage or directly contact the glass sheet 20 along the to-be-removed peripheral portion as made clear below.

In addition to the primary retention plane 124, the predetermined position as dictated by the support device 102 at the removal apparatus 100 can implicate other features of the glass sheet 20. For example, the glass sheet 20 can be loaded to the support device 102 such that a location of the first major side surface 30 relative to the support device 102 can be determined or is known (e.g., where dimensions of the glass sheet 20 are estimated, determined or known and the glass sheet 20 is centered relative to the support device 102, a distance from a centerline (or other location) of the support device 102 to the first major side surface 30 can then be determined or is known). Thus, beneficial locations and/or operations of the scoring device 104, the force applicator device 106 and/or the back-up bar assembly 108 for performing peripheral portion separation and removal operations at a desired section of the glass sheet 20 can be determined or designated relative to the support device 102. For example, and with additional reference to the non-limiting embodiment of FIG. 3, the support device 102 can have or establish a centerline 132, and the glass sheet 20 can be loaded to the support device 102 such that the opposing first and second side edge surfaces 30, 32 are centered about to the centerline 132. Relative to the X, Y, Z coordinate system common to FIGS. 2 and 3, then, a distance in a direction of the X axis between the centerline 132 and the first side edge surface 30 can be determined or is known. At a determined or known final position of the support device 102 at the removal apparatus 100, a distance between the centerline 132 (or other geometric identifier of the support device 102) in a direction of the X axis and one or more other components (e.g., the scoring device 104, the force applicator device 106, the back-up bar assembly 108, etc.) can also be determined or is known. Thus, and as described in greater detail below, the determined or known final position of the support device 102 in a direction of the X axis can be selected to locate the first side edge surface 30 at a desired position relative to, for example, the scoring device 104. Alternatively or in addition, components of the scoring device 104 (as well as possibly other components of the removal apparatus 100 such as the force applicator device 106, the back-up bar assembly 108, etc.) can be maneuvered in a direction of the X axis relative to the known or determined final position of the support device 102 so as to interface with the glass sheet 20 at a desired location relative to the first side edge surface 30. By way of simplified example, where a desired width of the peripheral portion to be removed is 1 centimeter (cm), the score line is beneficially formed 1 cm from the first side edge surface 30. Where the glass sheet 20 has a known or determined width (dimension in a direction of the X axis) of 400 cm and is centered about the centerline 132, 1 cm from the first side edge surface 30 is 199 cm from the centerline 132. Thus, with this simplified example, the final position of the support device 102 is arranged relative to the scoring device 104 and/or the scoring device 104 is arranged relative to the final position of the support device 102 such that the scoring device 104 will operate to impart a score line 199 cm from the centerline 132. From these explanations, it will be understood that an arrangement of various components of the removal apparatus 100 can be described relative to the centerline 132 or other known location of the support device 102.

With specific reference to FIG. 2, the scoring device 104 can assume various forms known in the art for imparting a score line or vent or scribe into the glass sheet 20. For example, the scoring device 104 can include a mechanical score wheel 140 carried by a tower 142. In general terms the tower 142 moves the score wheel 140 into and out of contact with the glass sheet 20 (with contact initiating at the first major surface 22), and the score wheel 140 can traverse along the tower 142 (e.g., into and out of the plane of the view of FIG. 2) to impart the score line. A nosing strip or bar 144 may also be provided. As is known in the art, scoring device 104 can operate to bring the nosing strip 144 into contact with the glass sheet 20 opposite the score wheel 140 (e.g., where the score wheel 140 contacts the first major surface 22, will contact the second major surface 24). When so arranged, the nosing strip 144 supports the glass sheet 20 against the applied force of the score wheel 140, and provides a surface against which the glass sheet 20 can bend to facilitate separation of the peripheral portion. Other glass sheet scoring arrangements or formats are also acceptable (e.g., score bar, laser scoring, ultrasound, high pressure water jet, etc.). Regardless, the scoring device 104 is configured and arranged relative to the support device 102 to impart the score line at a known or predetermined spatial location, for example relative to the centerline 132 (FIG. 3) or other known spatial feature of the support device 102. Stated otherwise, in the view of FIG. 2, the score wheel 140 is not yet in contact with the glass sheet 20. With subsequent operation of the scoring device 104 as described below, the score wheel 140 is brought into contact with the glass sheet 20 along a scoring plane that intersects the primary retention plane 124 at a score position designated at 146 in FIG. 2 (it being understood that the score position 146 of the scoring device 104 can be designated or determined regardless of whether the glass sheet 20 is actually present). The known or predetermined configuration and operation of the scoring device 104 is such that the score position 146 is at a determined or known distance along the primary retention plane 124 (e.g., in a direction of the X axis) from the centerline 132 (or other spatial feature) of the support device 102. While FIG. 2 implicates that the scoring device 104 operates to move the score wheel 140 in a linear direction from the initial state into contact with the glass sheet 20 at a point commensurate or aligned with the score position 146, in other embodiments the scoring device 104 can be configured to articulate the score-generating component (e.g., the score wheel 140) through a non-linear travel path from the initial state to the glass sheet 20. Regardless, the support device 102 and the scoring device 104 can be configured in tandem such that the score position 146 of the scoring device 104 is at a known or predetermined distance from the centerline 132 (or other spatial feature) of the support device 102. An arrangement of other components or features of the removal apparatus 100 can be described relative to the score position 146 as described below, independent of spatial features of the glass sheet 20. In other embodiments, an arrangement of components or features of the removal apparatus 100 can be described relative to spatial features of the glass sheet 20, for example relative to the first side edge surface 30.

The force applicator device 106 includes a push bar 150, a carriage 152, and a drive unit 154. The push bar 150 is mounted to the carriage 152 and terminates at a contact face 156. The push bar 150 is a rigid or semi-rigid body configured to readily transfer or apply a force onto glass. In some non-limiting embodiments, the push bar 150, or at least a component of the push bar 150 that provides the contact face 156, is a high temperature silicone rubber material, for example akin to materials conventionally used with or as the nosing strip 144. A shape of the push bar 150, and in particular of the contact face 156, can be flat as shown, although other shapes are also acceptable (pointed, curved, curvilinear, irregular, etc.). For example, the push bar 150 can be a square rod, circular rod, etc. In some non-limiting embodiments, the push bar 150 can be an extruded body shaped for replaceable insertion into a base. A width 158 of the contact face 156 is selected to generate a surface area sufficient for interfacing with the glass sheet 20, and in some embodiments is not greater than 50 millimeters (mm), optionally not greater than 40 mm, and in some embodiments is not greater than 30 mm, and in other non-limiting embodiments can be on the order of 12 mm. Thus, in some embodiments, the width 158 of the contact face 156 is less than the diameter of a vacuum cup conventionally used with glass sheet peripheral portion removal apparatuses. While the contact face 156 is generally illustrated as being linear across the width 158, in other embodiments the contact face 156 can be rounded to provide tangent contact or line contact with the glass sheet 20. In some embodiments, a length of the push bar 150 (i.e., Y axis dimension into and out of the plane of the view of FIG. 2) is selected to approximate or exceed an expected, corresponding dimension of the glass sheet 20 when arranged in the predetermined position by the support device 102. For example, and with additional reference to FIG. 1A, where the removal apparatus 100 is operated to remove a peripheral portion of the glass sheet 20 that includes the first side edge surface 30, a length of the push bar 150 can be greater than the dimension or length of the first side edge surface 30 (or dimension of the glass sheet 20 between the third and fourth side edge surfaces 34, 36). With this optional construction, the contact face 156 may more uniformly exert or transfer a force across the glass sheet 20 during peripheral portion removal operations as described below. In other embodiments, the push bar 150 can be sized so as to not extend across an entirety of the glass sheet 20. While FIG. 2 illustrates the force applicator device 106 as including one push bar 150, in other embodiments, two or more push bars can be provided.

The carriage 152 supports the push bar 150 and includes various components and/or mechanisms for moving the push bar 150 in a direction indicated by arrow 160 (e.g., the carriage 152 can be slidably mounted to a stationary base or frame). In some embodiments, the direction 160 can be substantially perpendicular (i.e., within 10 degrees of a truly perpendicular relationship) to the primary retention plane 124. Other relationships between the direction 160 and the primary retention plane 124 are also envisioned. Further, while the direction 160 is illustrated as being linear or straight, in other embodiments the carriage 152 can be configured to move the push bar 150 along a curved or curvilinear path. In a home or cycle start position of the carriage 152 illustrated in FIG. 2, the push bar 150 is located such that the contact face 156 and the score wheel 140 are at the same side of the primary retention plane 124 in some embodiments for reasons made clear below.

The drive unit 154 is generally configured to drive the carriage 152 so as to move the push bar 150 in a desired fashion along the direction 160. In some embodiments, the drive unit 154 includes a drive device 170 and a controller 172. The drive device 170 can assume various forms appropriate for effectuating powered movement of the carriage 152, and thus the push bar 150, in the direction 160 at speeds and forces appropriate for separating a peripheral portion of the glass sheet 20 along a score line as described in greater detail below. Thus, the drive device 170 can be pneumatic-based (e.g., one or more pneumatic cylinders), hydraulic-based, motorized, etc. The controller 172 controls actuation of the drive device 170, and can be or include a computer or computer-like instrument (e.g., PLC, computer, etc.) programmed (e.g., hardware, software, etc.) to operate the drive device 170 in a desired fashion. For example, in some optional embodiments, the drive unit 154 is a servomotor system, and includes a user interface that affords a user to easily change or adjust operational parameters (e.g., speed, stroke position, timing, etc.). In some embodiments, operation of the drive unit 154 is electronically coordinated with operation of one or both of the support device 102 and the scoring device 104. The controller 172 can be electronically connected to a controller (not) shown operating the support device 102 and a controller (not shown) operating the scoring device 104. For example, a system controller or computer can be programmed (hardware or software) to interface with the support device 102, scoring device 104, and the drive unit controller 172 to automatically implement the processes and methods described below.

The force applicator device 106 is configured and arranged relative to the support device 102 and the scoring device 104 to contact the retained glass sheet 20 at a known or predetermined spatial location, for example relative to the centerline 132 (FIG. 3) of the support device 102 and/or relative to the score position 146 of the scoring device 104. In the view of FIG. 2, the contact face 156 is not yet in contact with the glass sheet 20. With subsequent operation of the force applicator device 106 as described below, the contact face 156 is brought into contact with the glass sheet 22 along a push plane that intersects the primary retention plane 124 at a push position designated at 176 in FIG. 2 (it being understood that the push position 176 of the force applicator device 106 can be designated or determined regardless of whether the glass sheet 20 is actually present). The known or predetermined configuration and operation of the force applicator device 106 is such that the push position 176 is at a determined or known location along the primary retention plane 124 (e.g., in a direction of the X axis) relative to the centerline 132 and/or the score position 146. For example, in some embodiments the removal apparatus 100 is configured such that a distance from the centerline 132 (or other spatial feature of the support device 102) to the score position 146 is less than the distance from the centerline 132 (or other spatial feature) to the push position 176. Stated otherwise, the removal apparatus 100 is configured such that relative to the primary retention plane 124 (e.g., in a direction of the X axis), the push position 176 is outside of or beyond the score position 146. In related embodiments, a configuration of the removal apparatus 100 can be described relative to the glass sheet 20 as initially loaded into the removal apparatus 100, including the push position 176 being between the first side edge surface 30 and the score position 146.

The back-up bar assembly 108 generally includes a frame 180 maintaining one or more back-up bodies, such as a first back-up body 182 and a second back-up body 184. The back-up bodies 182, 184 can assume various forms appropriate for interfacing with glass (e.g., bar, rod, etc.), and extend from the frame 180 to an engagement face, such as a first engagement face 186 (provided by the first back-up body 182) and a second engagement face 188 (provided by the second back-up body 184). Where two (or more) are provided, the back-up bodies 182, 184, and thus the respective engagement faces 186, 188, can be spaced apart from one another along the frame 180. Further, the back-up bar assembly 108 is configured such that the first engagement face 186 is located closer to the primary retention plane 124 as compared to the second engagement face 188.

In particular, in some embodiments, the removal apparatus 100 is configured such that that the frame 180, and thus the back-up bodies 182, 184, remains stationary during the peripheral portion removal operations described below, including the back-up bar assembly 108 resisting expected forces applied onto the back-up bodies 182, 184. For example, the frame 180 (or other body attached to the frame 180) can be rigidly installed to a floor of the glass manufacturing facility. With these and similar stationary constructions, the back-up bar assembly 108 is configured and arranged such that the first engagement face 186 is maintained at a designated position relative to the primary retention plane 124, the score position 146 and the push position 176 for reason made clear below. Further, the second engagement face 188 is maintained at a designated position that is off-set from the first engagement face 186 in a direction opposite the primary retention plane 124.

For example, the first engagement face 186 is maintained at a location that is spatially between the score position 146 of the scoring device 104 and the push position 176 of the force applicator device 106. Alternatively stated, an imaginary line extending from the first engagement face 186 perpendicular to the primary retention plane 124 (e.g., an imaginary line in a direction of the Z axis) intersects the primary retention plane 124 at a first back-up position 190; in some embodiments, the removal apparatus 100 is configured such that the first back-up position 190 is between the score position 146 and the push position 176. Alternatively, in some embodiments the removal apparatus 100 is configured such that a linear distance in a direction parallel with the primary retention plane 124 from the centerline 132 (FIG. 3) to the first engagement face 186 is greater than a linear distance between the centerline 132 and the score position 146, and is less than a linear distance between the centerline 132 and the push position 176. In addition, the first engagement face 186 is maintained at a distance from the primary retention plane 124 sufficient to permit deflection and separation of a peripheral portion of the glass sheet 20 from a remainder thereof at a formed score line as described in greater detail below. In some embodiments, the particular distance between the first engagement face 186 and the primary retention plane 124 can be selected as a function of various process parameters, including a composition and thickness of the particular glass sheet 20. In more general terms, the first engagement face 186 can be described as being positioned relative to the primary retention plane 124 opposite the scoring device 104 and so as to not contact the glass sheet 20 prior to and during operation of the scoring device 104.

In some embodiments, the second engagement face 188 is maintained at a location that is spatially between the push position 176 of the force applicator device 106 and the first engagement face 186. Alternatively stated, an imaginary line extending from the second engagement face 188 perpendicular to the primary retention plane 124 (e.g., an imaginary line in a direction of the Z axis) intersects the primary retention plane 124 at a second back-up position 192; in some embodiments, the removal apparatus 100 is configured such that the second back-up position 192 is between the push position 176 and the first back-up position 190. Alternatively, in some embodiments the removal apparatus 100 is configured such that a linear distance in a direction parallel with the primary retention plane 124 from the centerline 132 (FIG. 3) to the second engagement face 188 is greater than a linear distance between the centerline 132 and the first engagement face 186, and is greater than a linear distance between the centerline 132 and the push position 176. In addition, the second engagement face 188 is maintained at a distance from the primary retention plane 124 that is greater than the distance between the first engagement face 186 and the primary retention plane 124 for reasons made clear below.

The spatial arrangements of the first and second engagement faces 186, 188 as described above can be achieved in various fashions. For example, in some embodiments the frame 180 is rigidly secured in space (i.e., will not move when subjected to expected forces during the peripheral portion removal operations described below), and maintains the first and second back-up bodies 182, 184 as shown. In other embodiments, the frame 180 can be mounted to a base (not shown) in a manner permitting selective movement of the frame 180 so as to position the first and second back-up bodies 182, 184, and thus the first and second engagement faces 186, 188, as desired. For example, the frame 180 can be controllably manipulated by a drive device such as a pneumatic-based drive (e.g., one or more pneumatic cylinders), hydraulic-based drive, motorized drive, etc. In yet other embodiments, one or both of the back-up bodies 182, 184 is movably coupled to the frame 180. With this optional construction, the frame 180 can provide for a general spatial arrangement, and one or both of the back-up bodies 182, 184 can be articulated relative to the frame 180 to more precisely position the respective engagement faces 186, 188 as desired. In related embodiments, a distance between the primary retention plane 124 and one or more components of the back-up bar assembly 108, for example a desired distance between the primary retention plane 124 and the first engagement face 186 and/or a distance between the primary retention plane 124 and the second engagement face 188, can be determined for a particular glass sheet handling operation, and the back-up bar assembly 108 manipulated (e.g., the drive device (not shown)) to achieve the desired distance(s).

In some embodiments, a configuration and arrangement of components of the removal apparatus 100 can be described relative to the first side edge surface 30 of the glass sheet 20 as retained at the removal apparatus 100, such as in terms of distances in a direction parallel with the primary retention plane 124. For example, the score position 146 of the scoring device 104 is located at a first distance D1 from the first side edge surface 30. The first engagement face 186 is located at a second distance D2 from the first side edge surface 30, with the second distance D2 being less than the first distance D1. The push location 176 of the force applicator device 106 is located at a third distance D3 from the first side edge surface 30, with the third distance D3 being less than the second distance D2. Finally, the second engagement face 188 is located at a fourth distance D4 from the first side edge surface 30, with the fourth distance D4 being less than the third distance D3.

Figure 4:
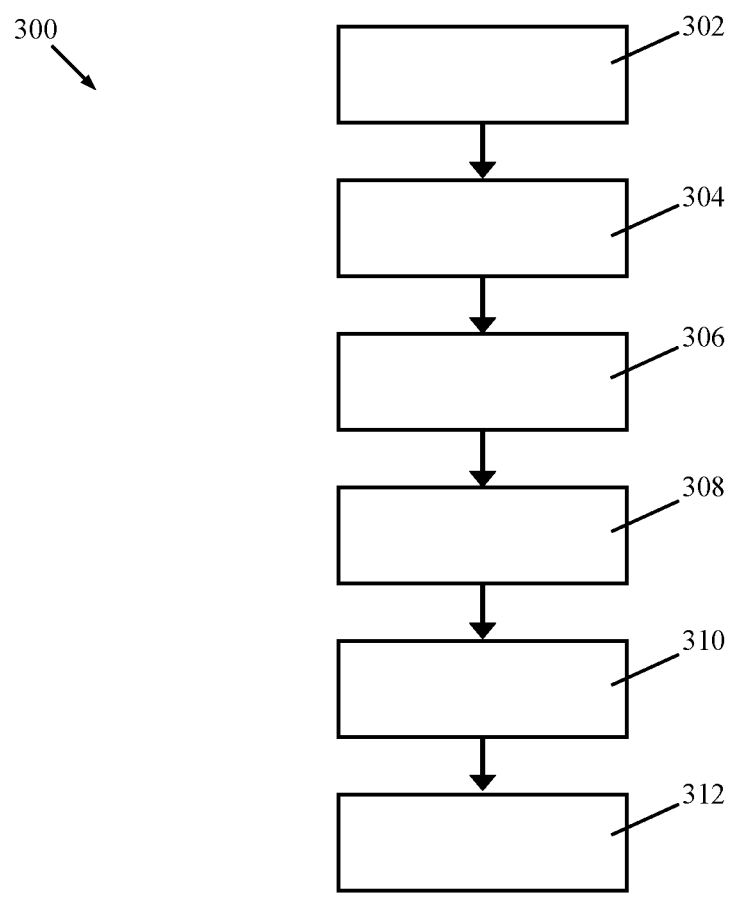
FIG. 4 is a flow chart illustrating exemplary steps of removing a peripheral portion of a glass sheet in accordance with principles of the present disclosure.
Figure 5A:
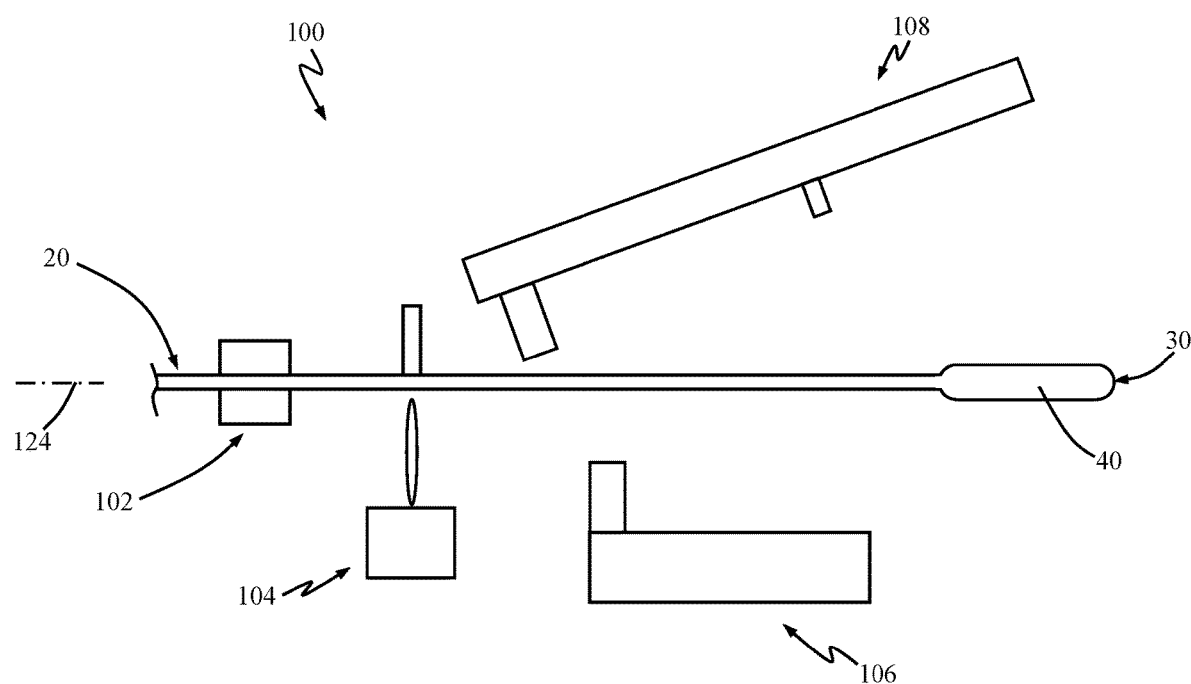
FIGS. 5A-5F are simplified end views of the removal apparatus of FIG. 2 performing the method of FIG. 4.
Figure 5B:
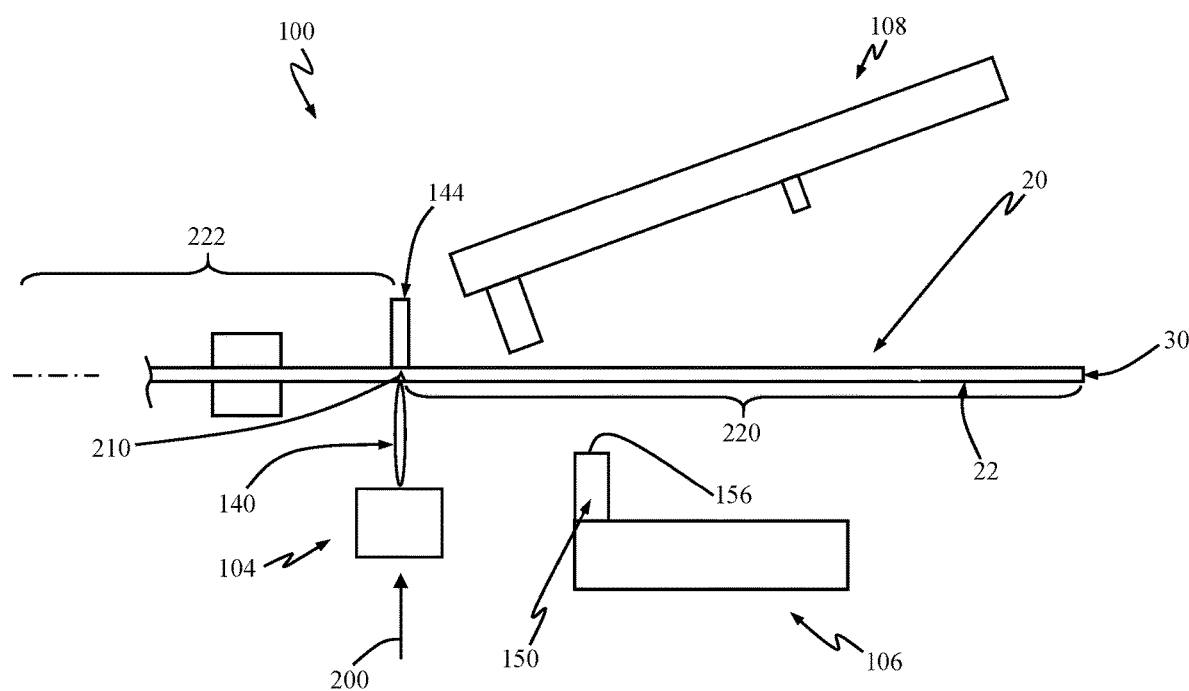
Figure 5C:
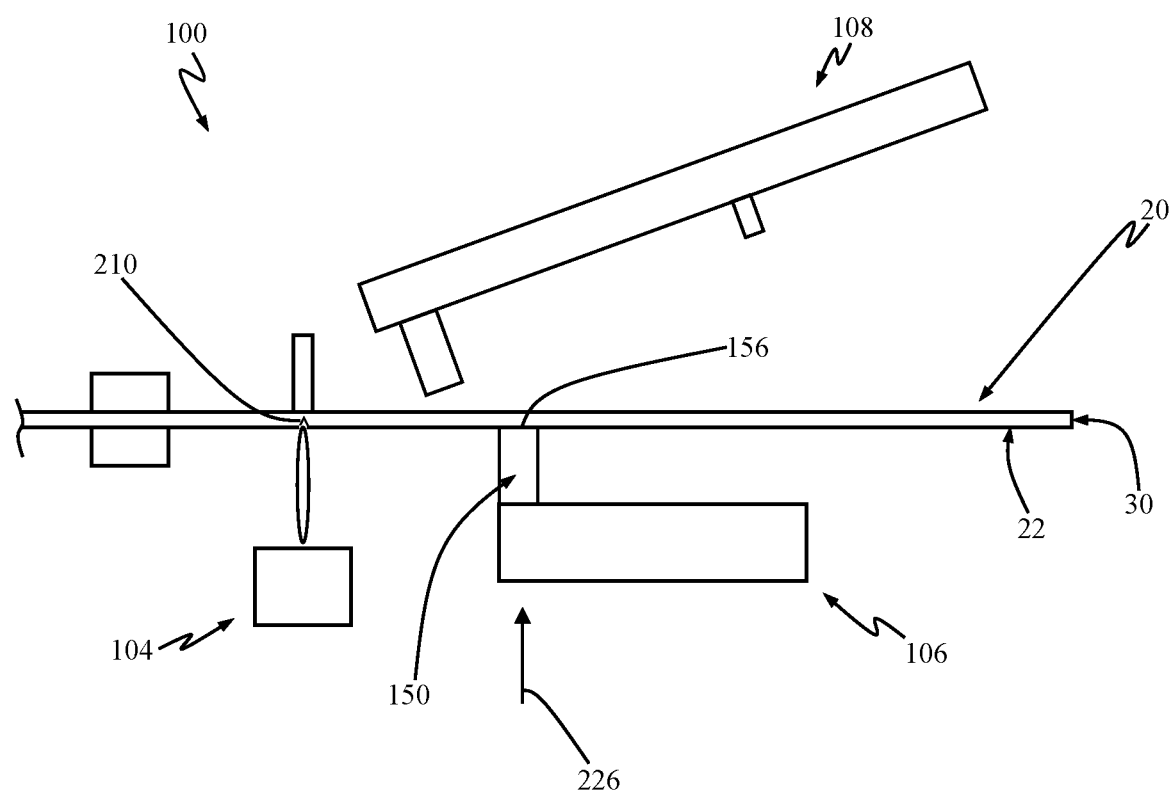
Figure 5D:
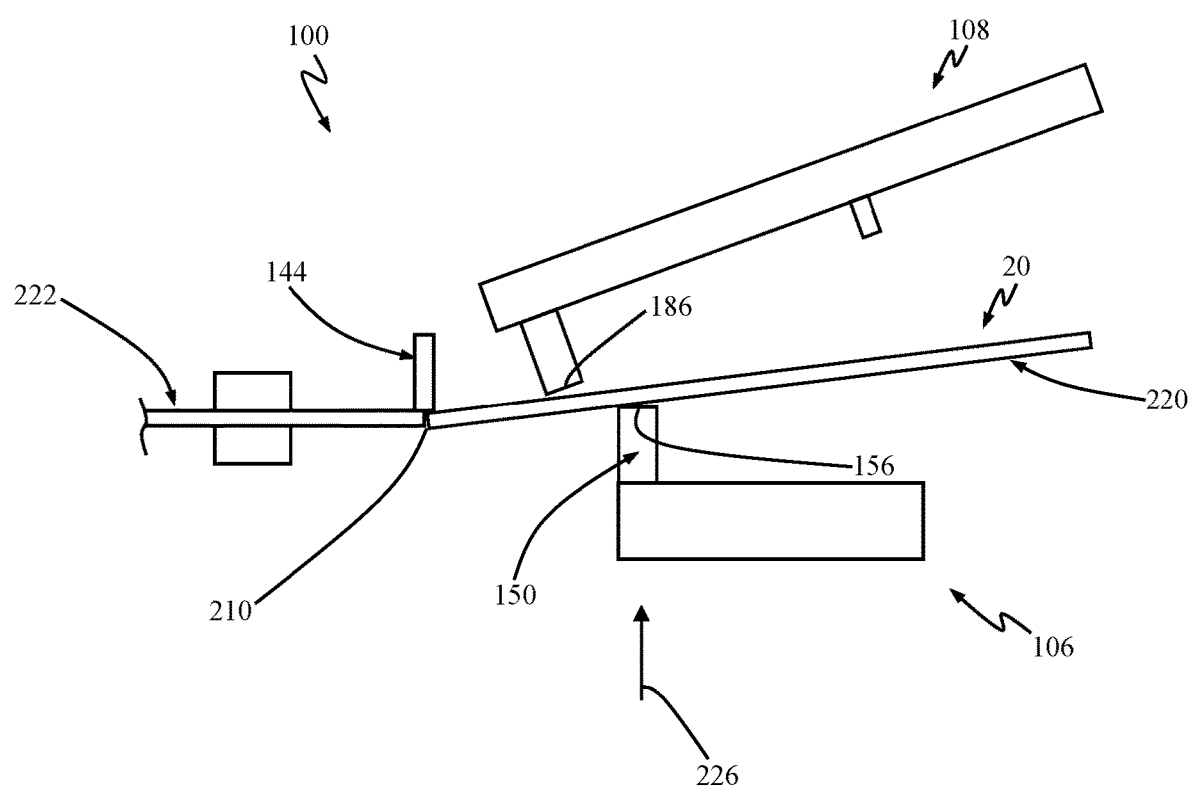

One non-limiting example of a method 300 for removing a peripheral portion of a glass sheet in accordance with principles of the present disclosure, for example via operation of the removal apparatus 100 (FIG. 2), is schematically shown in FIG. 4. Beginning at step 302, and with additional reference to FIG. 5A, the glass sheet 20 is first received at or by the removal apparatus 100 and placed in a predetermined position. For example, the glass sheet 20 is secured to the support device 102, and the support device 102 is operated to locate and retain the glass sheet 20 at the predetermined position that otherwise has determined or known relationships relative to other components of the removal apparatus 100 as described above. In some embodiments, the support device 102 maintains the glass sheet 20 in the primary retention plane 124, and establishes a known or determined location of first side edge surface 30. As a point of reference, the peripheral portion removal operations and methods implicated by FIGS. 5A-5F relate to removal of a peripheral portion that includes the first side edge surface 30. It will be recalled that the glass sheet 20 may or may not include the first bead region 40 at the first side edge surface 30. For ease of illustration, the first bead region 40 is not shown in the remaining views of FIGS. 5B-5F.

At step 304, a score line is formed on the first major surface 30 of the glass sheet 20. For example, and with reference to FIG. 5B, the scoring device 104 is operated to move the score wheel 140 (e.g., in the direction of arrow 200) into contact with the first major face 22, followed by operation of the score wheel 140 to impart a score line or vent 210 (referenced generally). In some embodiments, the score line 210 can extend from a vicinity of the third side edge surface 34 (best seen in FIG. 1A) to a vicinity of the fourth side edge surface 36 (FIG. 1A), but the score wheel 140 (or other score forming implement) may not directly touch the very edge line of the third and/or fourth side edge surfaces 34, 36. In other embodiments, the score line 210 may extend to the very edge line of one or both of the third and fourth side edge surface 34, 36. Regardless, the score line 210 demarcates a peripheral portion 220 and a center region 222 of the glass sheet 20, with the peripheral portion 220 being defined between the score line 210 and the first side edge surface 30. In some embodiments, during the step of forming the score line 210 (i.e., step 304), the peripheral portion 220 is essentially unconstrained or held by the removal apparatus 100 during the score line-forming operation (e.g., apart from the nosing strip 144 contacting a small section of the peripheral portion 220 immediately at the score line 210, no other component of the removal apparatus 100, including the force applicator device 106 and the back-up bar assembly 108, contacts or engages the peripheral portion 220 as the score line 210 is being imparted). With these and similar embodiments, and unlike some conventional peripheral portion removal apparatuses and methods in which a vacuum cup array or clamp is engaged with the peripheral portion during score line formation, a deformation stress is not induced into the peripheral portion 220 as the score line 210 is formed. As a point of reference, were the peripheral portion 220 to be constrained during formation of the score line 210, deformation stresses may be induced into the peripheral portion that in turn may hinder consistent scoring, and may increase the energy required to achieve separation of the peripheral portion 220 from the center region 222 along the score line 210.

At step 306, the push bar 150 is moved in a direction of the back-up bar assembly 108 such that the contact face 156 contacts the first major surface 22 along the peripheral portion 220. For example, in FIG. 5C the force applicator device 106 has been operated to move the push bar 150 in a direction 226 toward the glass sheet 20, and is now closer to the back-up bar assembly 108 as compared to the arrangement of FIG. 5B. The contact face 156 has been brought into contacting the first major surface 22 along the peripheral portion 220 (for ease of illustration, the peripheral portion 220 is not labeled in FIG. 5C). Stated otherwise, the contact face 156 is brought into contact with the first major surface 22 at a location between the first side edge surface 30 and the score line 210. In some embodiments, operation of the force applicator device 106 is timed or correlated with operation of the scoring device 104 such that the contact face 156 engages the first major surface 22 immediately after the score line 210 is complete. For example, the force applicator device 106 can be operated to initiate movement of the push bar 150 toward the glass sheet 20 prior to completion of the score line 210 (e.g., the score motion of the score wheel 40 is not yet complete). Where operational timing of the scoring device 104 is determined or known, the contact face 156 can come into contact with the first major surface 22 less than one second after the score line 210 is complete in some embodiments. With these and similar embodiments, this efficient motion can beneficially reduce an overall cycle time of the peripheral portion removal process.

The push bar 150 is further moved in the direction 226 (i.e., in a direction of the back-up bar assembly 108), causing the peripheral portion 220 (FIG. 5B) to separate from the center region 222 (FIG. 5B) along the score line 210 at step 308. For example, in FIG. 5D the force applicator device 106 has been operated to further move the push bar 150 (as compared to the arrangement of FIG. 5C) in the direction 226, with a pushing force being applied onto the peripheral portion 220 at the contact face 156. With continued advancement of the push bar 150 in the direction of the back-up bar assembly 108, the peripheral portion 220 is caused to deflect or bend relative to the center region 222 at the score line 210. In some embodiments, the nosing strip 144 can provide a surface about which the peripheral portion 220 may deflect. As the peripheral portion 220 is caused to deflect, the glass sheet 20 will fracture at the score line 210, eventually completely separating from the center region 222. As reflected by FIG. 5D, at the instant in time at which the peripheral portion 220 first completely separates from the center region 222, the peripheral portion 220 is not in contact with the back-up bar assembly 108. As described above, the first engagement face 186 represents the portion of the back-up bar assembly 108 most proximate the glass sheet 20. With this in mind, the back-up bar assembly 108 is configured or arranged such that the first engagement face 186 does not interfere with or prevent deflection of the peripheral portion 220 sufficient to achieve complete separation at the score line 210. As a point of reference, the level or amount of deflection (e.g., angle between the peripheral portion 220 and the center region 222) necessary to effect complete separation at the score line 210 may depend upon process variables, such as composition of the glass sheet 20, thickness of the glass sheet 20, depth and quality of the score line 210, temperature of the glass sheet 20, etc., and in some embodiments may be on the order of 7 degrees. In some embodiments, prior to a peripheral portion removal operation, the back-up bar assembly 108 can be adjusted in accordance with one or more of these properties (or based on test runs, etc.) to locate the first engagement face 186 so as to not interfere with or prevent necessary deflection of the peripheral portion 220.

Figure 5E:
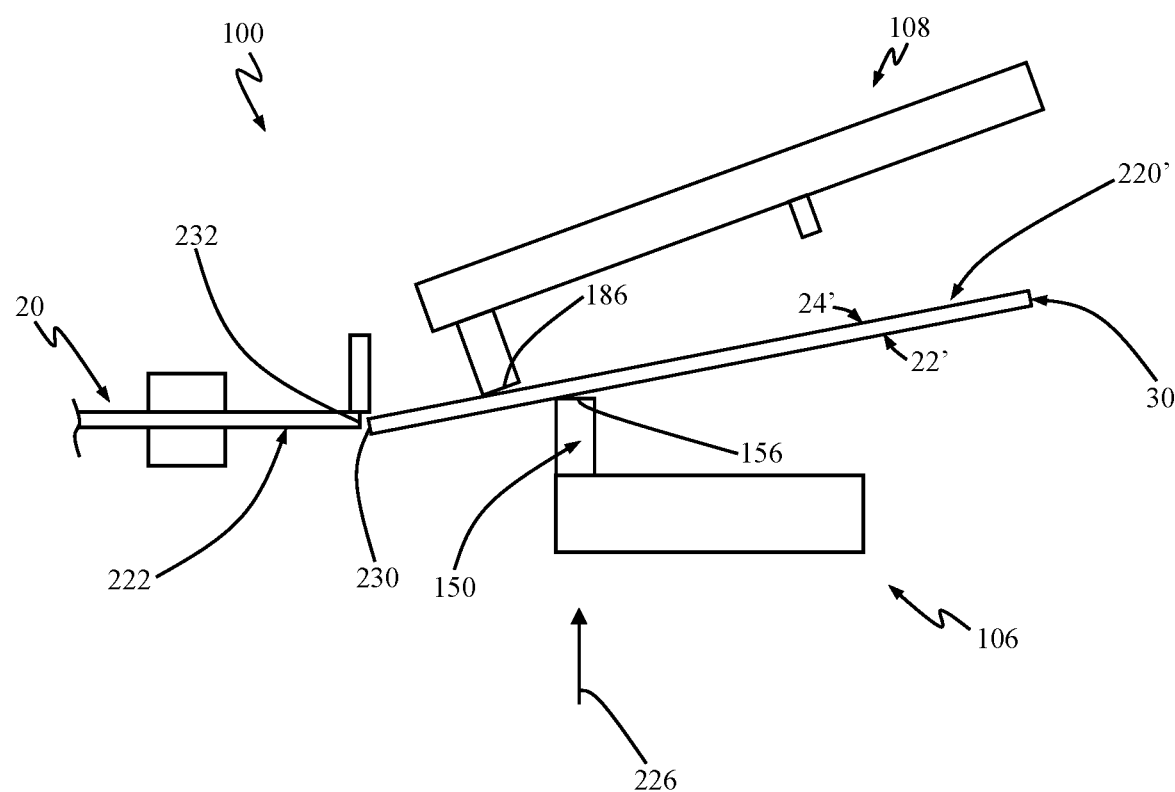

At step 310, the push bar 150 is further moved in the direction 226 (i.e., in a direction toward the back-up bar assembly 108) to capture the separated peripheral portion between the push bar 150 and the back-up bar assembly 108. For example, in FIG. 5E the force applicator device 106 has been operated to further move the push bar 150 (as compared to the arrangement of FIG. 5D) in the direction 226. The separated peripheral portion is labeled as 220' FIG. 5E to further clarify that it is no longer contiguous with or part of the remainder of the glass sheet 20. Consistent with the previous descriptions of the glass sheet 20, the separated peripheral portion 220' has opposing major surfaces labeled as 22', 24', and terminates at the first side edge surface 30 and a scored edge 230. FIG. 5E also identifies a newly formed scored edge 232 of the center region 222. Continued movement of the push bar 150 applies a pushing force onto the separated peripheral portion 220' that directs the second major face 24' into contact with the first engagement face 186. As a point of reference, with embodiments in which the glass sheet 20 is vertically oriented during the peripheral portion removal process, once the separated peripheral portion 220' is completely free of the center region 222 (i.e., the arrangement of FIG. 5D), the separated peripheral portion 220' will begin to fall under the force of gravity. Thus, while the separated peripheral portion 220' may drop or slide vertically along the contact face 156, with continued advancement of the push bar 150, the separated peripheral portion 220' will be directed to the first engagement face 186.

The push bar 150 is further moved in the direction 226 from the arrangement of FIG. 5E, causing the separated peripheral portion 220' to pivot about the first engagement face 186. For example, at the instant in time of FIG. 5E, the first engagement face 186 is in contact with the second major face 24', and the contact face 156 is in contact with the first major face 22' at a location between the first engagement face 186 and the first side edge surface 30. Thus, as the push bar 150 is further advanced, the separated peripheral portion 220' will pivot, in turn moving the scored edge 230 of the separated peripheral portion 220' away from the scored edge 232 of the center region 222. In some embodiments, then, the removal apparatus 100 operates to limit or even eliminate the possibility that the separated peripheral portion 220' will contact or damage the center region 222.

Figure 5F:
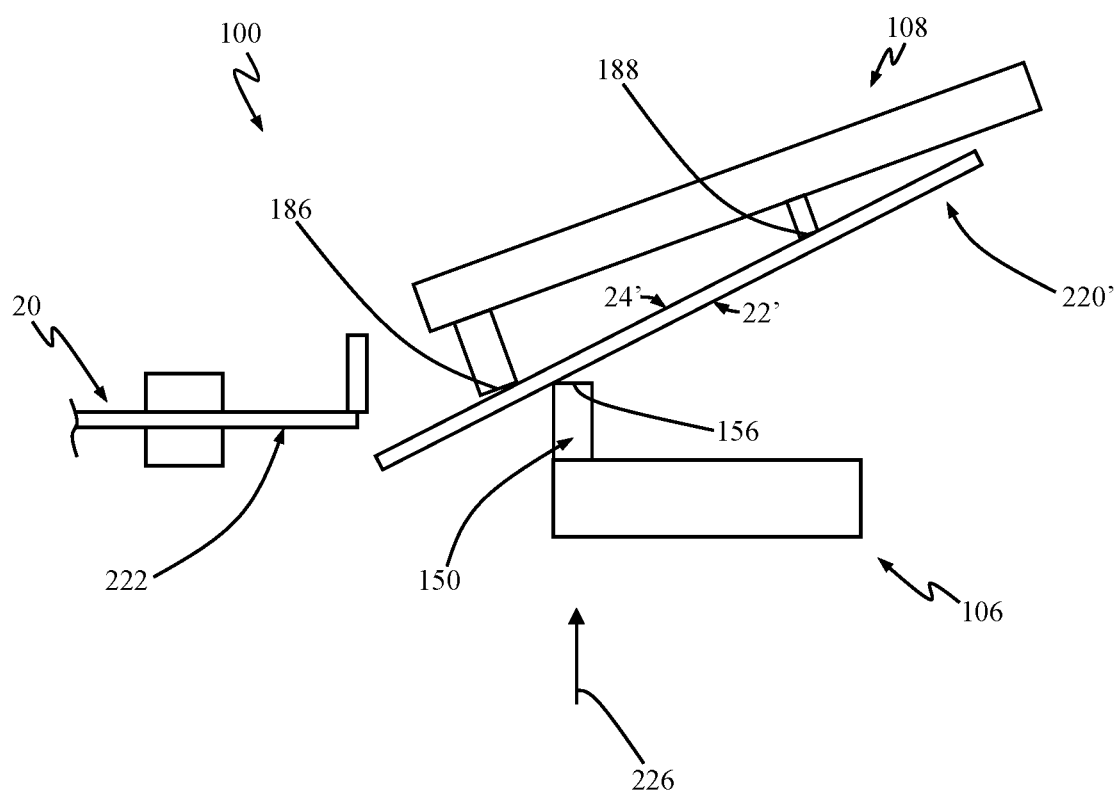

Advancement of the push bar 150 in the direction 226 continues, directing the separated peripheral portion 220' into contact with the second engagement face 188 as shown in FIG. 5F. A comparison of FIG. 5F with FIG. 5E further illustrates pivoting of the separated peripheral portion 220' about the first engagement face 186 with advancement of the push bar 150. In the arrangement of FIG. 5F, the separated peripheral portion 220' is now captured between the push bar 150 and the back-up bar assembly 108. More particularly, the first and second engagement faces 186, 188 are in contact with the second major face 24', whereas the contact face 156 is in contact with the first major surface 22' at a location between the first and second engagement faces 186, 188. With the push bar 150 continuing to apply a force onto the separated peripheral portion 220' and the back-up bar assembly 108 resisting this applied force at the engagement faces 186, 188, the separated peripheral portion 220' is trapped or captured and no longer rotates (or falls under circumstances where the glass sheet 20 is being processed in a vertical orientation). While the separated peripheral portion 220' is illustrated as being substantially planar in the captured arrangement, in some embodiments, the separated peripheral portion 220' may be caused to bow or curve at the contact face 156 (e.g., depending upon a thickness of the separated peripheral portion 220' and/or the force being applied by the push bar 150).

In some embodiments, methods of the present disclosure include the push bar 150 continuously moving or traveling from the point of initial contact with the glass sheet 20 (i.e., the state of FIG. 5C) to the point of capturing the separated peripheral portion 220' (i.e., the state of FIG. 5F). In some embodiments, the push bar 150 is caused to travel at a constant speed. In other embodiments, a velocity of the push bar 150 can vary throughout the removal operation. Regardless, in some embodiments, the travel distance and/or travel speed of the push bar 150 from the point of initial contact to the point of capture can vary as a function of a thickness of the glass sheet 20 and, with embodiments in which the glass sheet 20 is being processed in a vertical orientation, an acceptable or desired drop distance of the separated peripheral portion 220' (e.g., a distance the separated peripheral portion 220' can fall from the point of separation to the point of capture, the distance the separated peripheral portion 220' will subsequently be allowed to fall when released from the removal apparatus 100 as described below, etc.). With some methods of the present disclosure, a desired travel distance and/or travel speed of the push bar 150 can be determined in advance and the removal apparatus 100 formatted in accordance with the determinations. For example, in some embodiments, the drive unit 154 (FIG. 2) is programmed to generate a desired travel distance and/or speed of the push bar 150, the back-up bar assembly 108 is arranged to locate the first engagement face 186 and/or the second engagement face 188 at a desired distance from the glass sheet 20, etc.

At step 312, the separated peripheral portion 220' is released from the push bar 150 and the back-up bar assembly 108. For example, in some embodiments, the push bar 150 is moved away from the engagement faces 186, 188 (i.e., in a direction opposite the direction 226) and/or the back-up bar assembly 108 is operated to move the engagement faces 186, 188 away from the push bar 150. Once released, the separated peripheral portion 220' can be removed further away from the center region 222. For example, where the glass sheet 20 is processed in a vertical orientation, once the separated peripheral portion 220' is released, the separated peripheral portion 220' will fall under the force of gravity, for example into a collection bin (e.g., via a cullet chute or conveyor). With these and similar embodiments, path of the falling separated peripheral portion 220' can optionally be controlled or dictated by the removal apparatus 100. For example, the removal apparatus 100 can be operated to slowly retract the push bar 150 away from the back-up bar assembly 108 such that the energy stored in the separated peripheral portion 220' in the captured state is slowly released; under these circumstances, the separated peripheral portion 220' may remain planar and simply drop vertically. In other embodiments, the push bar 150 can be rapidly retracted from the back-up bar assembly 108, allowing energy stored in the captured separated peripheral portion 220' to quickly release; under these circumstances, the separated peripheral portion 220' may "bounce" or deflect and possibly rotate as it falls. Other techniques for removing the released separated peripheral portion 220' are also acceptable.

Once the separated peripheral portion 220' has been removed, the center region 222 can be further processed as desired. For example, the support device 102 can be operated to transport the center region 222 to another operational apparatus (e.g., a cleaning station, storage, shipping, etc.). Regardless, the removal apparatus 100 can automatically return to the home or cycle start position of FIG. 5A for processing another glass sheet.

The methods implicated by FIG. 4 are but one example of the present disclosure. In other embodiments, for example, one or more of the steps of FIG. 4 can be omitted. Additionally or alternatively, other steps can be added. It is to be understood that specific embodiments disclosed herein are intended to be exemplary and therefore non-limiting. In some embodiments, the glass sheet to be processed can be formed by a glass manufacturing system, can be provided as a glass sheet separated from a glass ribbon, can be provided as a glass sheet separated from another glass sheet, can be provided as a glass sheet uncoiled from a spool of glass sheets, can be provided as a glass sheet obtained from a stack of glass sheets, or can be provided as a freestanding glass sheet.

Figure 6:
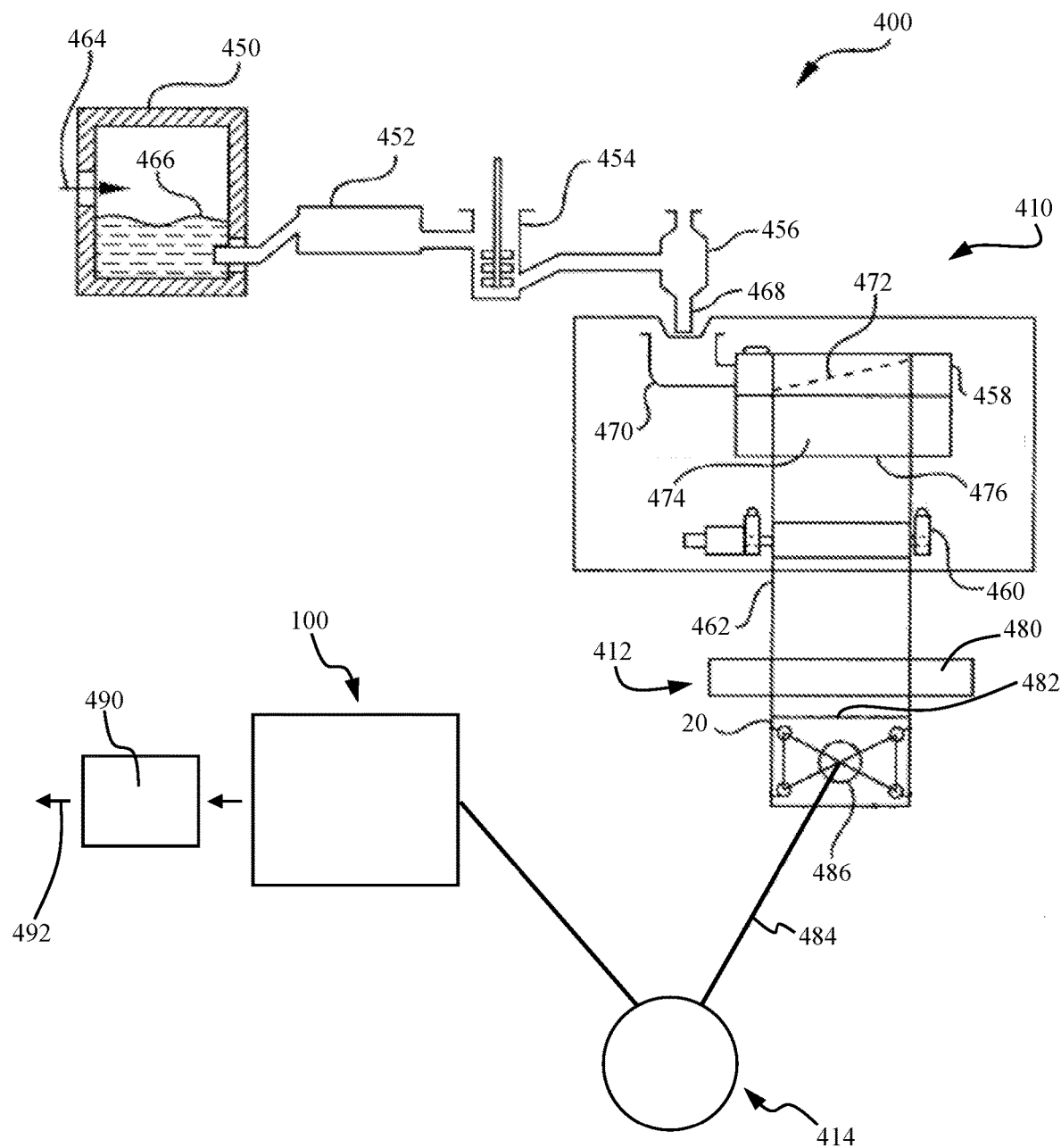
FIG. 6 is a schematic view of a portion of a glass manufacturing system in accordance with principles of the present disclosure.

As mentioned above, the peripheral portion removal apparatuses and methods of the present disclosure may be useful as part of a glass manufacturing system, for example with a glass manufacturing system producing glass in a draw operation. Some non-limiting embodiments are provided in FIG. 6. FIG. 6 generally depicts a glass manufacturing system used in the production of glass in a draw operation. The glass manufacturing system processes batch materials into molten glass, which is then introduced to a forming apparatus from which the molten glass flows to form a glass ribbon. While the following description is presented in the context of forming a sheet of glass in a fusion glass making process, the principles described herein are applicable to a broad range of activities where molten glass is contained within a closed or partially closed spaced and cooling of a glass ribbon generated from the molten glass is desired. The principles disclosed herein are therefore not limited by the following specific embodiments, and may be used, for example, in other glass making processes, such as float, up-draw, slot-style and Fourcault's-style processes.

Referring now to FIG. 6, the glass manufacturing system 400 incorporates a glass ribbon forming apparatus 410, a separating apparatus 412, a transport apparatus 414, and the removal apparatus 100. The forming apparatus 410 is configured to perform a fusion process and includes a melting vessel 450, a fining vessel 452, a mixing vessel 454, a delivery vessel 456, a forming body 458, and a draw device 460. The forming apparatus 410 produces a continuous glass ribbon 462 from batch materials, by melting and combining the batch materials into molten glass, distributing the molten glass into a preliminary shape, applying tension to the glass ribbon 462 to control dimensions of the glass ribbon 462 as the glass cools and viscosity increases. The separating apparatus 412 cuts discrete glass sheets 20 from the glass ribbon 462 after the glass has gone through a visco-elastic transition and has mechanical properties that give the glass sheets 20 stable dimensional characteristics. The visco-elastic region of the glass ribbon 462 extends from approximately the softening point of the glass to the strain point of the glass. Below the strain point, the glass is considered to behave elastically.

In operation, batch materials for forming glass are introduced into the melting vessel 450 as indicated by arrow 464 and are melted to form molten glass 466. The molten glass 466 flows into the fining vessel 452, which is maintained at a temperature above that of the melting vessel 450. From the fining vessel 452, the molten glass 466 flows into the mixing vessel 454, where the molten glass 466 undergoes a mixing process to homogenize the molten glass 466. The molten glass 466 flows from the mixing vessel 454 to the delivery vessel 456, which delivers the molten glass 466 through a downcomer 468 to an inlet 470 and into the forming body 458.

The forming body 458 depicted in FIG. 6 is used in a fusion draw process to produce the glass ribbon 462 that has high surface quality and low variation in thickness. The forming body 458 includes an opening that receives the molten glass 466. The molten glass 466 flows into a trough 472 and then overflows and runs down sides 474 (one of which is visible in FIG. 6) of the trough 472 in two partial ribbon portions before fusing together below a bottom edge (root) 476 of the forming body 458. The two partial ribbon portions of the still-molten glass 466 rejoin with one another (e.g., fuse) at locations below the root 476 of the forming body 458, thereby forming the glass ribbon 462. The glass ribbon 462 is drawn downward from the forming body 458 by the draw device 460. While the forming apparatus 410 as shown and described herein implements a fusion draw process, it should be understood that other forming apparatuses may be used including, without limitation, slot draw apparatuses and the like. The draw device 460 can include one or more roller assemblies (not shown) as known to those of skill in the art. The roller assemblies are arranged at positions along the draw device 460 to contact the glass ribbon 462 as the glass ribbon 462 moves through the draw device 460.

The separating apparatus 412 can include a glass separator 480. A variety of glass separators 480 may be provided in embodiments of the present disclosure. For example, a traveling anvil machine may be provided that can impart a score line 482 into the glass ribbon 462 to define a to-be-separated glass sheet 20. In some embodiments, a scribe (e.g., score wheel, diamond tip, etc.) can be utilized as understood by those of ordinary skill. In some embodiments, a laser-assisted separation device may be provided as understood by those of ordinary skill.

In some embodiments, components of the transport apparatus 414 can assist in the separation of the glass sheet 20 from the glass ribbon 462. For example, the transport apparatus 414 can include a robot 484 carrying an end effector 486 that is operated to bend the glass sheet 20 relative to the glass ribbon 462 to separate the glass sheet 20 from the glass ribbon 462 along the score line 482.

The robot 484 can be operated to deliver the separated glass sheet 20 to the removal apparatus 100. In other embodiments, the glass sheet 20 can be transported to an intermediate station by the transport apparatus 414, and subsequently transported to the removal apparatus 100. Regardless, the removal apparatus 100 operates as described above, removing one or more peripheral portions from the glass sheet 20. Processing at the removal apparatus 100 transitions the glass sheet 20 (e.g., removes bead regions, reduces a size, etc.) to a glass sheet article 490 that can then be subjected to subsequent handling and/or processing operations as indicated by arrow 492.

The removal apparatuses, glass manufacturing systems, and methods of the present disclosure provide a marked improvement over previous designs. The to-be-removed peripheral portion of the glass sheet not held or constrained during the mechanical scoring process and the bending/breaking process. Thus, minimal, if any, stress is induced into the peripheral portion, thereby enhancing score line formation and reducing energy required for separation. Further, the removal apparatuses and methods of the present disclosure can eliminate the conventional use of vacuum cups for capturing the peripheral portion. As a result, the increased cycle time, surface area, and replacement concerns associated with vacuum cups are avoided.

Various modifications and variations can be made to the embodiments described herein without departing from the scope of the claimed subject matter. Thus it is intended that the specification cover the modifications and variations of the various embodiments described herein provided such modifications and variations come within the scope of the appended claims and their equivalents.

What is claimed is:

1. A method for removing a peripheral portion of a glass sheet, the method comprising:
   receiving a glass sheet comprising a first major surface opposite a second major surface, a first side edge surface opposite a second side edge surface, and a third side edge surface opposite a fourth side edge surface, wherein each of the side edge surfaces connects the first major surface and the second major surface;
   placing the glass sheet in a predetermined position by securing the first and second major surfaces;
   forming a score line on the first major surface, the score line extending from a vicinity of the third side edge surface to a vicinity of the fourth side edge surface;
   wherein the score line demarcates a central region of the glass sheet and a peripheral portion of the glass sheet, the peripheral portion defined between the score line and the first side edge surface;
   a) moving a push bar in a direction of a back-up bar assembly such that the push bar contacts the first major surface along the peripheral portion;
   wherein prior to the step of moving the push bar, the push bar is spaced from the first major surface and the back-up bar assembly is located opposite the push bar relative to the glass sheet and is spaced from the second major surface;
   b) following step a), further moving the push bar in the direction to produce a separated peripheral portion by causing the peripheral portion to separate from the central region along the score line without contacting the back-up bar assembly; and
   c) following step b), further moving the push bar in the direction to capture the separated peripheral portion between the push bar and the back-up bar assembly.

2. The method of claim 1, wherein steps a)-c) are performed consecutively with continuous movement of the push bar in the direction.

3. The method of claim 1, wherein the back-up bar assembly comprises a first engagement face, the method further comprising:
   following step b) and prior to step c), further moving the push bar in the direction to cause the second major surface of the separated peripheral portion to contact the first engagement face.

4. The method of claim 3, wherein the step of further moving the push bar in the direction to cause the second major surface of the separated peripheral portion to contact the first engagement face comprises the separated peripheral portion pivoting about the first engagement face.

5. The method of claim 4, wherein immediately following step b), the separated peripheral portion comprises a scored side edge opposite the first side edge surface, and further wherein the step of the separated peripheral portion pivoting about the first engagement face comprises the scored side edge moving away from the central region.

6. The method of claim 4, wherein the step of further moving the push bar in the direction to cause the second major surface of the separated peripheral portion to contact the first engagement face comprises a linear distance between the first side edge surface of the separated peripheral portion and the first engagement face being greater than a linear distance between the first side edge surface of the separated peripheral portion and the push bar.

7. The method of claim 4, wherein the back-up bar assembly further comprises a second engagement face spaced from the first engagement face, and further wherein step c) comprises the first and second engagement faces in contact with the second major surface of the separated peripheral portion, and the push bar in contact with the first major surface of the separated peripheral portion.

8. The method of claim 7, wherein step c) comprises a linear distance between the first side edge surface of the separated peripheral portion and the first engagement face being greater than a linear distance between the first side edge surface of the separated peripheral portion and the push bar, and the linear distance between the first side edge surface of the separated peripheral portion and the push bar being greater than a linear distance between the first side edge surface of the separated peripheral portion and the second engagement face.

9. The method of claim 1, further comprising:
following step c), releasing the separated peripheral portion from the push bar and the back-up bar assembly.

10. The method of claim 1, wherein the predetermined position comprises the glass sheet in a substantially vertical orientation.

11. The method of claim 1, wherein during the step of forming the score line, the method is characterized by the absence of a force being applied to the peripheral portion along the first and second major surfaces.

12. An apparatus for removing a peripheral portion from a central region of a glass sheet, the glass sheet comprising a first major surface opposite a second major surface, the apparatus comprising:
a support device adapted for placing the glass sheet in a predetermined position, the predetermined position comprising a primary retention plane;
a scoring device adapted to form a score line on the first major surface, wherein the score line demarcates the peripheral portion and the central region;
a force applicator device comprising a push bar;
a back-up bar assembly comprising a first engagement face; and
servo motor actuator for driving the push bar,
wherein the apparatus comprises a cycle start state in which the push bar and the first engagement face are arranged at opposite sides of the primary retention plane;
and further wherein the force applicator device is adapted to move the push bar in a direction of the first engagement face via operation of the servo motor actuator to sequentially cause:
the push bar to apply a pushing force onto the first major surface at the peripheral portion to cause the peripheral portion to separate from the central region at the score line thereby producing a separated peripheral portion,
the push bar to apply a pushing force onto the first major surface of the separated peripheral portion to cause the separated peripheral portion to contact the first engagement face,
the push bar to apply a pushing force onto the first major surface of the separated peripheral portion to capture the separated peripheral portion between the push bar and the back-up bar assembly.

13. The apparatus of claim 12, wherein the back-up bar assembly further comprises a second engagement face spaced from the first engagement face.

14. The apparatus of claim 13, wherein the back-up bar assembly is configured and arranged relative to the push bar such that with movement of the push bar in the direction, the separated peripheral portion is caused to contact the first engagement face followed by contacting the second engagement face.

15. The apparatus of claim 14, wherein a distance between the first engagement face and the primary retention plane in a direction perpendicular to the primary retention plane is less than a distance between the second engagement face and the primary retention plane in the direction perpendicular to the primary retention plane.

16. The apparatus of claim 12, wherein the scoring device is configured and arranged relative to the support device to impart the score line along a scoring plane that intersects the primary retention plane at a score position, and further wherein the first engagement face is maintained at a location such that an imaginary line extending from the first engagement face perpendicular to the primary retention plane intersects the primary retention plane at a first back-up position, and further wherein the force applicator device is configured and arranged relative to the scoring device to direct the push bar along a push plane that intersects the primary retention plane at a push position, and even further wherein the apparatus is configured such that the first back-up position is between the score position and the push position.

17. The apparatus of claim 16, wherein the back-up bar assembly further comprises a second engagement face maintained at a location such that an imaginary line extending from the second engagement face perpendicular to the primary retention plane intersects the primary retention plane at a second back-up position, and further wherein the push position is between the first back-up position and the second back-up position.

18. The apparatus of claim 12, wherein the support device comprises a suspension assembly such that the primary retention plane is substantially vertical.

19. A method for making a glass sheet article, the method comprising:
forming a glass ribbon;
separating a glass sheet from the glass ribbon;
delivering the glass sheet to a removal apparatus, the glass sheet comprising a first major surface opposite a second major surface, a first side edge surface opposite a second side edge surface, and a third side edge surface opposite a fourth side edge surface;
operating the removal apparatus to:
place the glass sheet in a predetermined position,
form a score line on the first major surface,
wherein the score line demarcates a central region of the glass sheet and a peripheral portion of the glass sheet, the peripheral portion defined between the score line and the first side edge surface,
a) move a push bar in a direction of a back-up bar assembly such that the push bar contacts the first major surface along the peripheral portion,
wherein prior to the step of moving the push bar, the push bar is spaced from the first major surface and the back-up bar assembly is located opposite the push bar relative to the glass sheet and is spaced from the second major surface,
b) following step a), further move the push bar in the direction to produce a separated peripheral portion by causing the peripheral portion to separate from the central region along the score line without contacting the back-up bar assembly, and
c) following step b), further moving the push bar in the direction to capture the separated peripheral portion between the push bar and the back-up bar assembly,
wherein following step b), the central region comprises the glass sheet article.

* * * * *

UNITED STATES PATENT AND TRADEMARK OFFICE
CERTIFICATE OF CORRECTION

| | |
|---|---|
| PATENT NO. | : 11,795,096 B2 |
| APPLICATION NO. | : 17/054832 |
| DATED | : October 24, 2023 |
| INVENTOR(S) | : Nils Paul Fornell et al. |

It is certified that error appears in the above-identified patent and that said Letters Patent is hereby corrected as shown below:

In the Claims

In Column 21, Line 25, in Claim 12, delete "servo" and insert -- a servo --.

Signed and Sealed this
Thirtieth Day of April, 2024

Katherine Kelly Vidal
*Director of the United States Patent and Trademark Office*